United States Patent
Dale

[15] 3,663,183
[45] May 16, 1972

[54] FLUORINE COMPOUND
[72] Inventor: James W. Dale, Winchester, Mass.
[73] Assignee: Monsanto Research Corporation, St. Louis, Mo.
[22] Filed: Mar. 30, 1964
[21] Appl. No.: 356,356

[52] U.S. Cl. .................................23/367, 23/88, 149/109
[51] Int. Cl. .........................................................C01b 7/00
[58] Field of Search ...............................23/367, 88; 149/109

[56] References Cited

UNITED STATES PATENTS 3,143,391   8/1964   Hurley et al. ...........................23/88 X

*Primary Examiner*—Carl D. Quarforth
*Assistant Examiner*—F. M. Gittes
*Attorney*—R. M. Dickey, L. A. Ferris and M. B. Moshier

[57] ABSTRACT

As a new compound, difluorochlorinium hexafluorobismuthate, of the formula $ClF_2BiF_6$.

1 Claim, No Drawings

FLUORINE COMPOUND

This invention relates to a new compound, and more particularly, to a new fluorine compound.

$ClF_3$ and $BrF_3$ are known to react with certain metal halides to form addition products which can be formulated as compounds in which the cation is the $BrF_2^+$ or $ClF_2^+$ ion. It is known that $BrF_3$ reacts with $BiF_5$ to produce a compound of the formula $BiBrF_8$, which may be formulated as $BrF_2^+BiF_6^-$, for example. These compounds will in turn metathesize with halides of certain monovalent metals, such as sodium, potassium and silver, to form the corresponding metal hexafluorobismuthates. However, it has been observed that $BrF_2BiF_6$ does not react with barium fluoride under the same conditions.

It is an object of this invention to provide a novel fluorine compound.

A particular object of this invention is to provide a novel compound of fluorine, chlorine and bismuth.

These and other objects will become evident upon consideration of the following specification and claims.

In accordance with this invention, a novel compound is provided, of the formula $BiClF_8$, which may be formulated as $ClF_2^+BiF^-$, and named difluorochlorinium hexafluorobismuthate.

The stated compound, it has been found, in contrast to the corresponding bromine compound, $BrF_2^+BiF_6^-$, has the valuable property of reacting with barium fluoride to produce $Ba(BiF_6)_2$perty of gelling $ClF_3$, as set forth in the copending application of Henry P. Beltramini and the present inventor, Ser. No. 347,995, filed Feb. 25, 1964, in view of which the stated reactivity of the difluorochlorinium hexafluorobismuthate is importantly significant.

The presently provided difluorochlorinium compound is also useful for a variety of other purposes. The compound may be used as a stable, storable source of chlorine trifluoride: whereas $ClF_3$ is a gas at usual ambient temperatures, the present product is a stable solid, which is thus generally more convenient to store and handle. Regeneration of $ClF_3$ can be accomplished by reacting the compound with an alkali metal fluoride.

The presently provided novel compound can also be used for various other purposes. The novel compound of this invention is a high energy oxidizer, and may be used as an oxidant, in propellant compositions and the like. Still further, the present novel compound may be used as a fluorinating agent, to convert metal oxides as encountered in mineral ores, for example, to the corresponding metal fluorides. The stated conversion, conducted at elevated temperatures and pressures, is quantitative in many instances, and indeed, may be used in a system of ore analysis if desired, to enable oxygen content to be determined directly and quantitatively.

Synthesis of the presently provided difluorochlorinium compound is accomplished simply by dissolving bismuth pentafluoride in chlorine trifluoride. Evaporation of excess $ClF_3$ leaves the desired compound as a residue. The reaction proceeds as illustrated by the equation $$ClF_3 + BiF_5 \rightarrow ClF_2BiF_6$$

The stoichiometric ratio of the reactants for formation of the desired product as shown in the above equation is a 1:1 molar ratio. The reaction will proceed with an excess of one reagent over the other, and indeed, it is conveniently conducted using an excess of the chlorine trifluoride as the reaction medium. Large excesses of the $ClF_3$ may be used if desired, amounting to a 100:1 molar ratio to the $BiF_5$ or even more, when it is desired to provide dilute solutions of the resulting product for any reason. The bismuth fluoride may alternatively be present in excess. The reaction will proceed to form the fluorochlorinium salt as product, but since $BiF_5$ is a solid, it is usually less convenient to remove any excess of this reagent from the product.

Conditions for the reaction of $ClF_3$ and $BiF_5$ to form the $ClF_2BiF_6$ may vary considerably. In general, contacting the reactants is sufficient to produce the desired reaction, which occurs practically instantaneously on solution of $BiF_5$ in the $ClF_3$. It is usually convenient to conduct the reaction at temperatures at which $ClF_3$ is liquid at atmospheric pressure, that is, at temperatures below about 12° C. The reaction temperature may be considerably below this, ranging down to −50° C., for example. Temperatures above 12° C., up to say 100° C., may alternatively be employed if desired, in which case $ClF_3$ may be contacted as a gas with solid $BiF_5$, for a time sufficient to permit absorption of the gas by the solid, or the $ClF_3$ may be held in the liquid phase at these more elevated temperatures by application of superatmospheric pressure. For example, the pressures under which the reaction mixture is held during formation of the desired product may range up to superatmospheric pressures as high as 5,000 pounds per square inch. Subatmospheric pressures may also be employed, ranging down to say 0.1 mm Hg, if desired, especially when lower temperatures are used, but in general, the preferred reaction conditions are pressures close to atmospheric, and temperatures in the range of −50° C. to 0° C.

The invention is illustrated but not limited by the following examples.

EXAMPLE 1

To prepare $ClF_2BiF_6$, 50 g of $BiF_5$ is added to a large excess of $ClF_3$ in a reactor made of tetrafluoroethylene polymer and maintained at −23° C. The mixture is stirred for several hours and the reactor is warmed to room temperature to drive off excess $ClF_3$. The product is crushed and swept for several hours with dry nitrogen. The weight of white, solid product obtained represents better than a 98 percent yield. Analysis of a sample shows a fluorine and chlorine content agreeing with that calculated for $ClF_2BiF_6$.

EXAMPLE 2

A solution of 1.29 g $ClF_2BiF_6$ in $ClF_3$ is maintained at 0° C. while 0.28 g barium difluoride is added, the amounts of $BaF_2$ and $ClF_2BiF_6$ being calculated to provide 1.28 g of barium hexafluorobismuthate, which is 6 percent of the weight of the 20 g of $ClF_3$ present initially. Upon moderate stirring, gelation occurs rapidly. When the $ClF_3$ is evaporated off from the gel under a stream of dry nitrogen, and the remaining solid is mixed with water, reactivity with water is negligible, indicating that the metathesis is complete and all that remains is barium hexafluorobismuthate. (Unreacted $ClF_2BiF_2$ will react explosively with water).

While the invention has been described with reference to various specific preferred embodiments thereof, it is to be appreciated that modifications and variations can be made without departing from the scope of the invention, which is limited only as defined in the appended claim.

WHAT IS CLAIMED IS:

As a new compound, difluorochlorinium hexafluorobismuthate, of the formula $ClF_2BiF_6$.

* * * * *